US006446042B1

(12) United States Patent
Detlef et al.

(10) Patent No.: US 6,446,042 B1
(45) Date of Patent: Sep. 3, 2002

(54) METHOD AND APPARATUS FOR ENCODING SPEECH IN A COMMUNICATIONS NETWORK

(75) Inventors: Michael John Detlef; Atsushi Ishii, both of Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/440,156

(22) Filed: Nov. 15, 1999

(51) Int. Cl.[7] ........................... G10L 21/02; G10L 19/14
(52) U.S. Cl. ...................... 704/275; 704/501; 704/503; 704/201
(58) Field of Search .................... 704/275, 251, 704/257, 270.1, 217, 201

(56) References Cited

U.S. PATENT DOCUMENTS

| 4,058,838 A | 11/1977 | Crager et al. | |
|---|---|---|---|
| 4,624,008 A | 11/1986 | Vensko et al. | |
| 4,649,567 A | 3/1987 | Childress | |
| 4,975,957 A | 12/1990 | Ichikawa et al. | |
| 5,406,617 A | 4/1995 | Bauer | |
| 5,432,883 A | 7/1995 | Yoshihara | |
| 5,515,375 A | 5/1996 | DeClerck | |
| 5,570,389 A | 10/1996 | Rossi | |
| 5,592,586 A * | 1/1997 | Maitra et al. ................ | 704/221 |
| 5,600,649 A | 2/1997 | Sharma et al. | |
| 5,615,297 A * | 3/1997 | Davis ........................... | 704/201 |
| 5,684,791 A | 11/1997 | Raychaudhuri et al. | |
| 5,737,716 A | 4/1998 | Bergstrom et al. | |
| 5,754,734 A | 5/1998 | Emeott et al. | |
| 5,970,457 A * | 10/1999 | Brant et al. .................. | 704/275 |
| 5,999,898 A * | 12/1999 | Richter ........................ | 704/217 |
| 6,188,978 B1 * | 2/2001 | Harada ........................ | 704/201 |
| 6,226,533 B1 * | 5/2001 | Akahane ...................... | 704/503 |

FOREIGN PATENT DOCUMENTS

| JP | 01-066416 | * 3/1989 | ............. H04J/3/00 |
|---|---|---|---|
| JP | 10-363571 | * 12/1998 | ........... H04L/12/56 |

OTHER PUBLICATIONS

Shimokoshi et al ("A Study of Voice/Non–Voice Discrimination Method using Neural Networks for Integrated Packet Switching System", ISCAS 1989).*

* cited by examiner

Primary Examiner—Richemond Dorvil
Assistant Examiner—Daniel A. Nolan
(74) Attorney, Agent, or Firm—Robert D. Varitz, P.C.

(57) ABSTRACT

A speech encoding system for use with a digital cellular communication device and a receiving station, includes a mechanism for determining whether a voice communications packet needs to be treated as a data communications packet; a voice recognition mechanism for receiving instructions by voice command; and a control mechanism for responding to said voice command and controlling a controlled entity. A method for encoding a voice command generated on a digital cellular communication device and transmitted over a wireless communication network to a receiving station for controlling a controllable entity includes recognizing a voice command; determining whether the voice command needs to be treated as a data communications packet; encoding the voice command; connecting the voice command to a voice recognition mechanism; and controlling a controlled entity with the voice command.

15 Claims, 3 Drawing Sheets

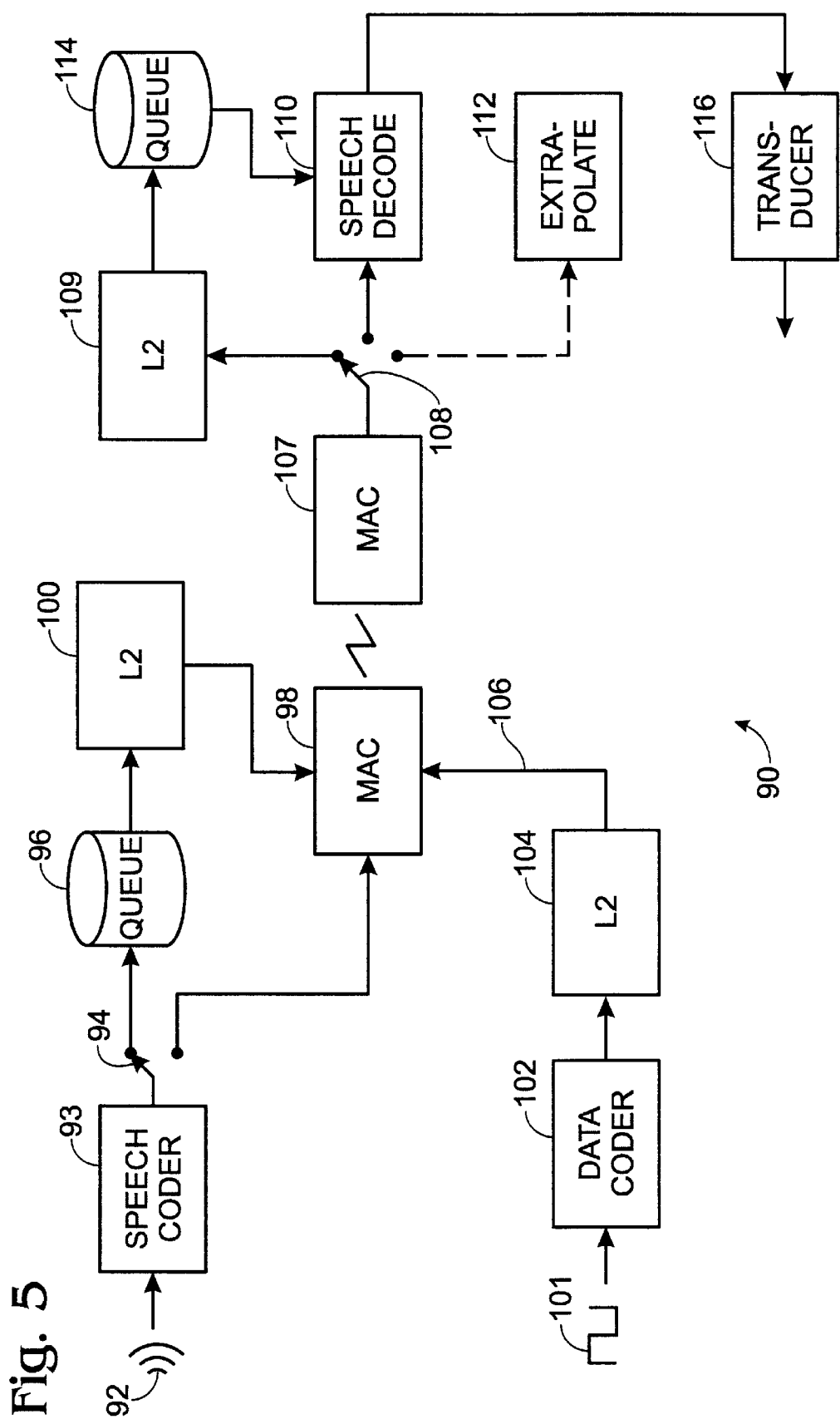

METHOD AND APPARATUS FOR ENCODING SPEECH IN A COMMUNICATIONS NETWORK

FIELD OF THE INVENTION

This invention relates to mobile communications, and specifically to the elimination of speech drop-outs for certain voice transmissions.

BACKGROUND OF THE INVENTION

Effective voice recognition technology can reduce the need for keypads and large displays. This is important when considering portable devices which are intended to connect to the world-wide communications network known as the internet. The problem is that current voice recognition technology, which is suitable for use on portable, battery-powered devices, fails to achieve needed speed or accuracy. The solution, because such products are intended to connect wirelessly to a network, is to install voice recognition hardware and software on network-based servers which a user can dial into.

Server-based recognition systems are in widespread use in wired telephone networks for such tasks as directory assistance and simple data look-up, and work well as long as the caller is using a wired telephone. Problems develop, however, when a digital wireless, e.g., cellular or PCS, telephone is used. This is because speech processing algorithms in use by all major wireless standards, such as GSM, IS-136, IS-95 and PDC, do not provide for error-free transmission. This results in signal corruption, which appear as muted "blocks" of speech, on the order of 20 ms each. To improve the perceived voice quality at the receiving end, these same systems often perform some form of extrapolation or smoothing operation to make the corruption less noticeable to the human auditory system. Unfortunately, tests have established that the underlying corruption and the follow-on extrapolation or smoothing renders the received speech nearly imperceptible to high-performance server-based speech recognition systems. Prior art systems and methods do not offer a meaningful solution to the aforementioned problem, however, a number of attempts have been made to provide speech recognition systems and GSM communications, although very little work has been done to combine the two fields of art.

U.S. Pat. No. 4,058,838, granted Nov. 15, 1987 to Crager et al., for Packet-switched facsimile communications system, describes full duplex communications between a number of communications devices, using a store-and-forward protocol.

U.S. Pat. No. 4,624,008, granted Nov. 18, 1986 to Vensko et al., for Apparatus for automatic speech recognition, describes a technique for recognizing sentence end based on pause length.

U.S. Pat. No. 4,649,567, granted Mar. 10, 1987 to Childress, for Dispatch overdialing for inter-group and other added calling/called access to communications channels in a trunked radio communications system, describes as system enabling radio transceivers, already operating with a trunked system, to communicate with additional transceivers.

U.S. Pat. No. 4,975,957, granted Dec. 4, 1990, to Ichikawa et al., for Character voice communication system, describes the extraction of parameters at the handset and the transmission of codewords as data to a base station which reconstructs the speech, and focuses on transmission of parameters as a bandwidth-saving strategy, and the algorithm presented, assuming error-free codeword transmission, will likely result in significant voice quality degradation.

U.S. Pat. No. 5,406,617, granted Apr. 11, 1995, to Bauer, for Cordless telephone/entry intercom system, describes a radio-based intercom system wherein the base station acts as a repeater for the wireless system components.

U.S. Pat. No. 5,432,883, granted Jul. 11, 1995, to Yoshihara, for Voice coding apparatus with synthesized speech LPC [linear prediction coefficients] code book, describes a system for coding speech based on LPC and error minimization.

U.S. Pat. No. 5,515,375, granted May 7, 1996, to DeClerck, for Method and apparatus for multiplexing fixed length message data and variably coded speech, describes a voice coding techniques wherein a variable rate vocal encoder receives and encodes speech.

U.S. Pat. No. 5,570,389, granted Oct. 29, 1996, to Rossi, for Method for reliable exchange of modem handshaking information over a cellular radio carrier, describes a technique for sending an initial FSK-encoded modem handshake.

U.S. Pat. No. 5,600,649, granted Feb. 4, 1997, to Sharma et al., for Digital simultaneous voice and data modem, describes a system incorporating a PC for system control, and which allows voice communication, voice mail, EMail, facsimile management, and other communications functions.

U.S. Pat. No. 5,684,791, granted Nov. 4, 1997, to Raychaudhuri et al., for Data link control protocols for wireless ATM access channels, describes on-demand available bit-rate data burst transmission in a time division multiple access channel to confirm data accuracy.

U.S. Pat. No. 5,737,716, granted Apr. 7, 1998, to Bergstrom et al., for Method and apparatus for encoding speech using neural network technology for speech classification, describes a neural network VRS which operates in single or multi stages.

U.S. Pat. No. 5,754,734, granted May 19, 1998 to Emeott et al., for Method of transmitting voice coding information using cyclic redundancy check bits, describes a techniques for prioritizing encoded speech packets prior to error checking. After error checking, the packets are interleaved for transmission.

SUMMARY OF THE INVENTION

A speech encoding system for use with a digital cellular communication device and a receiving station, includes a mechanism for determining whether a voice communications packet needs to be treated as a data communications packet; a voice recognition mechanism for receiving instructions by voice command; and a control mechanism for responding to said voice command and controlling a controlled entity.

A method for encoding a voice command generated on a digital cellular communication device and transmitted over a wireless communication network to a receiving station for controlling a controllable entity includes recognizing a voice command; determining whether the voice command needs to be treated as a data communications packet; encoding the voice command; connecting the voice command to a voice recognition mechanism; and controlling a controlled entity with the voice command.

An object of the invention is to provide error-free voice transmission for providing voice control of a controlled entity.

Another object of the invention is to provide a voice recognition system for use with a digital cellular phone system.

These and other objects and advantages of the invention will become more fully apparent as the description which follows is read in conjunction with the drawings.

BRIEF DESCRIPTION OF THE DRAWINGS

FIG. 5 is a block diagram of a non-voice-over-IP protocol of the invention.

DETAILED DESCRIPTION OF THE PREFERRED EMBODIMENT

The invention disclosed herein provides a method of transferring error-free speech to the server-based voice recognition system. In conventional cellular, analog or digital, and PCS networks, voice and data are handled in a fundamentally different manner. Voice may or may not be coded in such a way as to allow some degree of error detection and correction at the receiving end. However, in no event does the receiving end ever request re-transmission of voice transmissions. The reason is that retry attempts would result in unpredictable delays which are probably less tolerable than occasional speech drop-outs.

On the other hand, data transmissions, which may include control messages tochange frequency or power level, are generally supervised and as such, protocols exist which allow retransmission in the event that a data message is not received, or is so corrupted as to not be intelligible.

The invention applies to any wireless digital voice communication system and provides for the intermittent special handling of voice information such that, at times when the caller is providing inputs to a speech recognition system, voice transmissions are handled like data transmissions, and thus arrive error-free at the receiving end, ready for submission to the voice recognition system (VRS), also referred to herein as a voice recognition mechanism.

Figure 1:
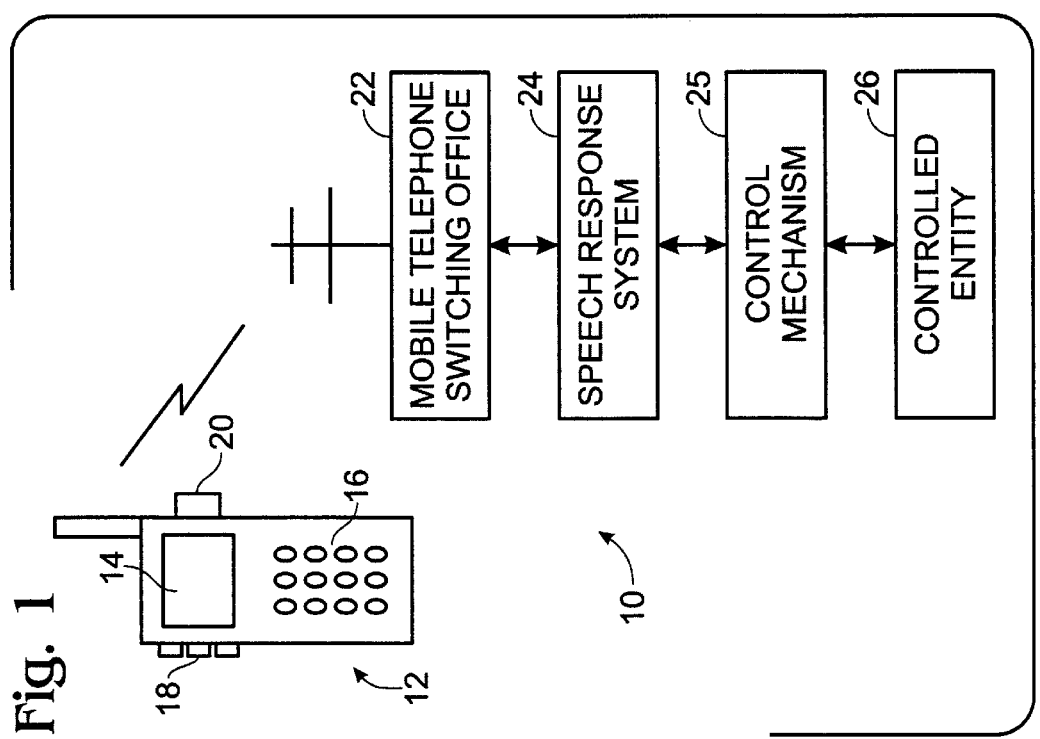
FIG. 1 is a block diagram of the system of the invention.

Referring now to FIG. 1, the system of the invention is depicted generally at 10. System 10 includes a mobile handset 12, which is a digital cellular telephone or PCS. Handset 12 includes a display 14, a keypad 16, a set of left-side buttons 18, and a push-to-talk button 20, which feature is unique to a handset of an invention, and is used in one embodiment of the invention. Handset 12 is in wireless communication with a mobile telephone switching office 22, or receiving station, which includes a VRS 24. System 10 further includes a control mechanism 25 connected to VRS 24 for controlling a controlled entity 26. The communications link between VRS 24 and control mechanism 25 may be any form of communications system. Handset 12 includes a HQ generation mechanism therein for generating voice command HQ data which is ultimately used to control controlled entity 26. System 10 is generally part of a telecommunications network which provides wireless and wired communications.

One embodiment of the invention includes "push-to-talk" button 18 on the handset. In this embodiment, a user is required to push button 18, also referred to herein as a high-quality button, when issuing speech commands that are submitted to VRS 24. While button 18 is pressed, digitized speech packets are treated like data messages, i.e., high quality, supervised transmissions, and office 22 can request re-transmission of any lost HQ data packets. Upon successful arrival of all packets, the network reconstructs the speech command and applies it to the terminating equipment, which includes control mechanism 25, having some type of intelligent voice response (IVR) system connected to controlled entity 26.

Figure 2:
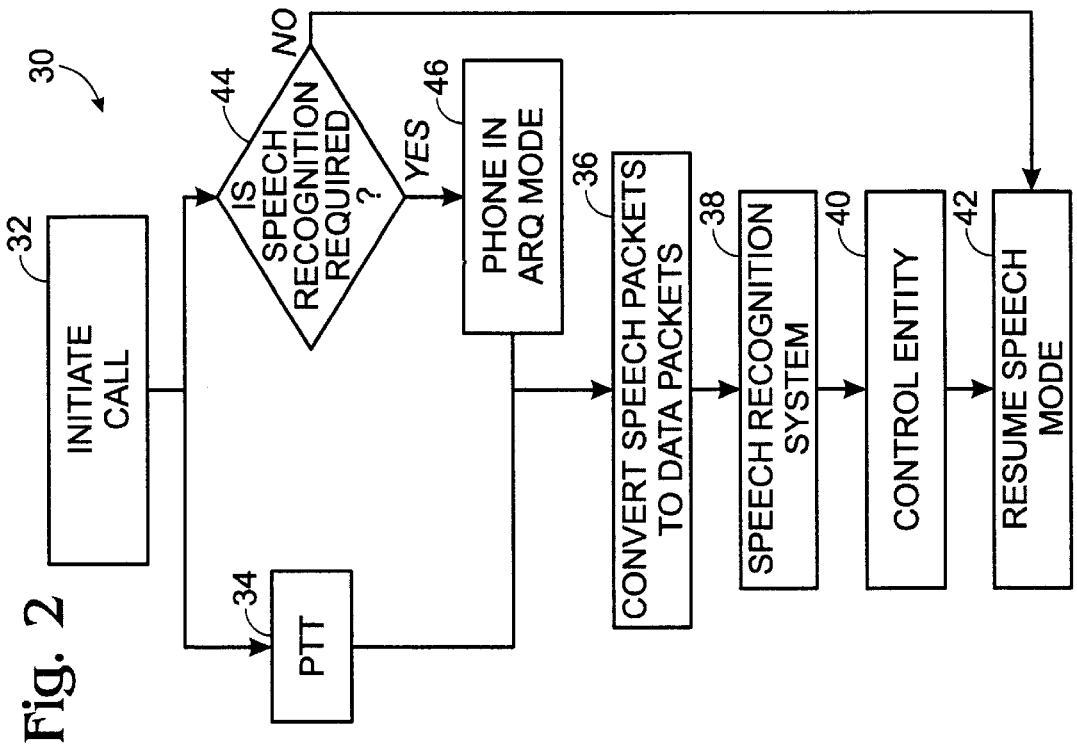
FIG. 2 is a block diagram of the method of the invention.

In another embodiment, for use in a more tightly integrated network/IVR system, the PTT button is not required. Both embodiments are depicted in FIG. 2, generally at 30. A user initiates a call, block 32, that may include voice commands. In a system constructed according to the first embodiment, the users depresses button 18, block 34, to instruct handset 12 to convert speech packets to data packets, block 36. The data packets, once fully received by office 22, are forward to VRS 24, block 38, and then transmitted, block 40, to a controlled entity. Once the transmission is completed, the user releases button 18, and handset 12 returns to normal voice mode, block 42.

In the second embodiment, the network is informed by the IVR that high quality speech inputs are needed, block 44. At this point, the network places handset 12 in automated response/query (ARQ) voice mode, block 46, for the duration of the command entry, resulting in high quality transmissions. The system then works as described in conjunction with the first embodiment, returning to normal quality voice mode at the end of the command sequence.

The invention may be applied to the scenario wherein speech communication takes place over an IP (Internet Protocol) network, where the IP voice packets, normally transferred by unreliable UDP (User Datagram Protocol), are now transferred by a reliable transmission protocol, such as TCP (Transmission Control Protocol), while the PTT button is pressed, or when the handset is placed in ARQ mode by office 22. This mechanism allows the reliable transmission of speech commands using the TCP retransmissions. This scenario requires no special support from network infrastructure because the IP network is transparent to any data transferred on IP packets.

The speech encoder/decoder used with an IP network, with its higher bit rate, may be used during the retransmission period in order to improve the speech quality. Because the communication is not real-time for that period, speech in any data rate may be transmitted regardless of the available physical bandwidth.

Figure 3:
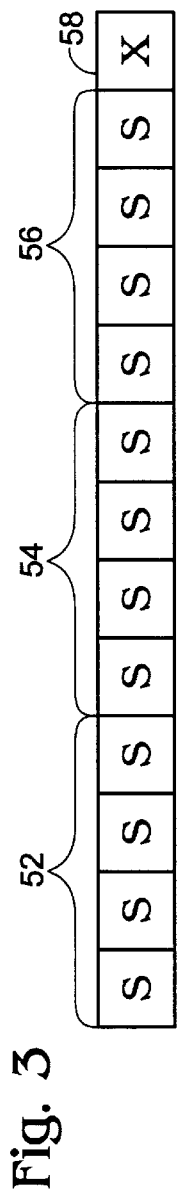
FIG. 3 is a block diagram of conventional wireless signal blocks.

Referring now to FIG. 3, a typical encoding sequence for GSM speech communications is depicted generally at 50. The sequence includes thirteen blocks, wherein speech is broken into four-block normal speech units, "S", 52, 54, and 56, each lasting approximately 20 ms, followed by a data block, "X", 58. Data block 58 is a slow associated control channel (SACCH). The blocks shown in FIG. 3 represent a total of 60 ms of transmission. Each individual block last approximately 4.615 ms.

Figure 4:
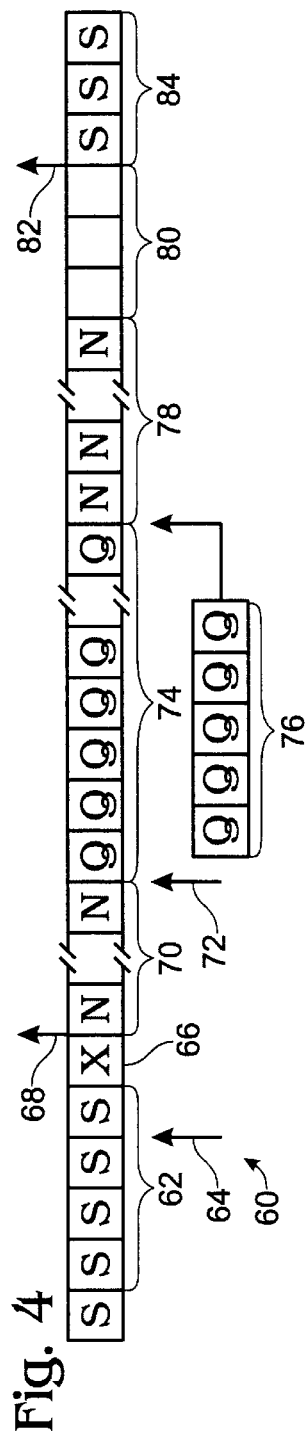
FIG. 4 is a block diagram of a signal block used by the invention.

Turning now to FIG. 4, an encoding sequence according to the invention is shown generally at 60. The sequence begins with a four-block normal speech unit 62. At some time during speech unit 62, the high-quality sequence is triggered, 64, either by the user pressing the high-quality button, or by automatic detection by IVR. (A conventional data block 66 is still transmitted as every thirteenth block throughout the transmission, although only one data block 66 is depicted in the figure.) Handset 12 indicates to the user that it is ready to begin high quality transmission following the transmission of data block 66, and signals the user by some form of starting indicator 68, such as a beep, or other starting confirmatory tone, generated by a notification mechanism in handset 12, to notify a user that handset 12 is in an HQ data acquisition mode. A start negotiation sequence "N" 70 commences while handset 12 negotiates with the network to begin error-free, high-quality transmission, in the form of a link access protocol, known as an L2 protocol. The mechanism of sending supervised messages in time slots normally allocated for unsupervised speech is similar to the manner in which Fast Associated Control Channels (FACCH) operate in handovers typical in analog and digital cellular networks. Afterwards, the user speaks instructions, which are sent by HQ transmission. Because of the high likelihood of interface-induced errors, periodic retransmission of HQ speech may be required. The HQ frames, "Q" 74, will typically encounter some queuing delay, and are thus termed "queued speech." The high-quality sequence is indicated as being over by the user releasing the high-quality button, or by the IVR providing an appropriate signal or command, as indicated by arrow 72. If office 22 does not receive all of the HQ frames error-free, it requests a re-transmission of missed frames 76, and does so until all HQ frames are received error-free. An 'end negotiation' 78 occurs at the end of the error-free transmission, and after all information has been successfully exchanged.

The L2 connection is released, and an ending indicator 82, such as an ending confirmatory tone, is generated and transmitted by handset 12, after a period of time Δt, 80, which is determined by an internal timer in handset 12 and on the basis of the number of HQ frames that handset 12 must transmit. Ending confirmatory tone 82 is generated by the notification mechanism to notify a user that handset 12 is no longer in the HQ data acquisition mode. Only after all of the HQ blocks for the HQ sequence are acquired will the speech decoder output the audio to the IVR system. Normal speech blocks 84 then resume. Blocks N and Q may be of any length needed to transmit the high-quality information, which include queuing delays, and any time required for re-transmission of data that includes errors. At some point, the voice recognition system 'decodes' the HQ speech into instructions for a controlled entity.

Two specific embodiments of the system of the invention will now be described. The first embodiment provides non-voice-over-IP protocol, while the second embodiment is a voice-over IP protocol. Turning initially to FIG. 5, a system utilizing a non-voice-over-IP protocol is depicted generally at 90. A voice input 92 is picked up by a voice coder 93 in handset 12. Assuming the high-quality function has been initiated, a HQ switch 94 (a.k.a. PTT button 20) is in its HQ position, and routes a signal to a queue 96. Were switch 94 in its normal position, the signal would be sent directly to a media access controller (MAC) 98. With switch 94 in its HQ position, the signal transits queue 96 and is processed by layer-two (L2) 100 prior to being sent to MAC 98. A digital signal 101 is sent to a data coder 102, then to a second L2 104. A slow associated control channel (SACCH) 106 transmits the data signal to MAC 98.

The signal(s) is transmitted wirelessly to a second MAC 107. A switch 108 is set to route the signal to an inbound L2 109, a speech decoder 110, or to an extrapolator 112. If the signal is routed to L2 109, it enters a queue 114 until the entire HQ signal is received. The HQ signal is then sent to speech decoder 110. The signal is output to a receiver by a transducer 116. At the start of the HQ mode, L2 109 sends the entire signal as time-contiguous speech to queue, or buffer, 114. At the end of the HQ mode, the entire captured buffer contents are send to speech decoder 110.

Figure 6:
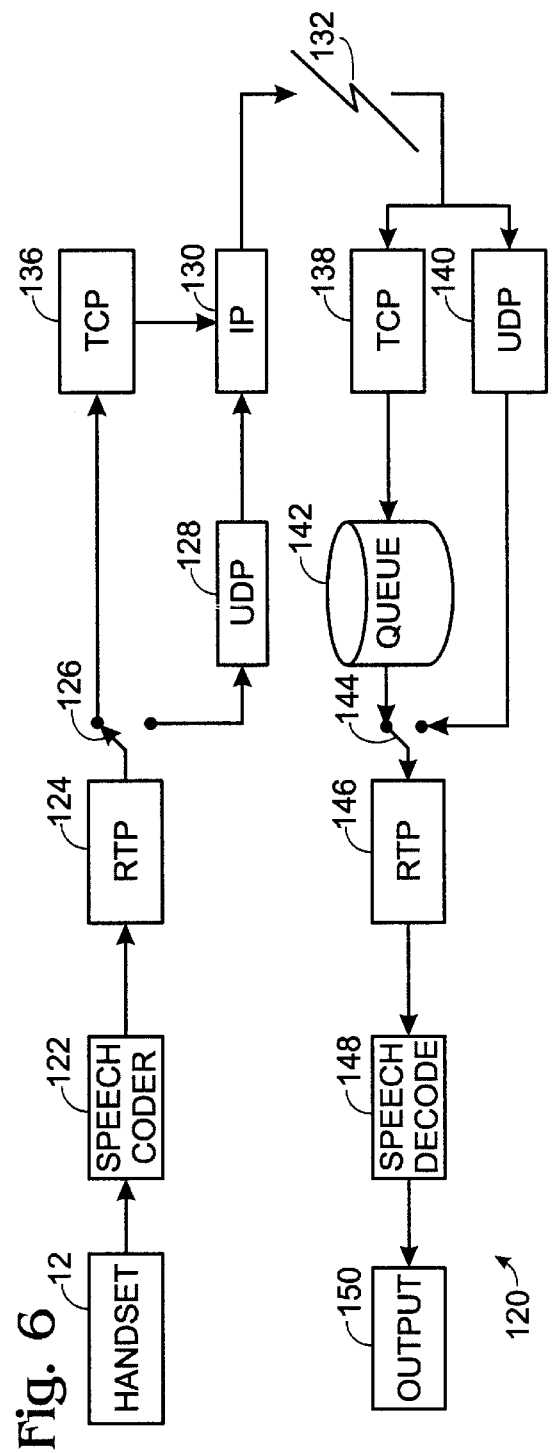
FIG. 6 is a block diagram of a voice-over-IP protocol of the invention.

A system using voice-over-IP protocol is shown generally at 120 in FIG. 6. In this embodiment, a signal is generated by handset 12, and the signal is sent to a voice coder 122, which send the signal using transmission real-time protocol (RTP) 124, which manages the relative timing of the voice packets and the information regarding those packets. If HQ switch 126 is set to normal, the signal is sent by user datagram protocol (UDP) 128 and then by, in the preferred embodiment, internet protocol (IP) 130, wirelessly, over the world-wide communications system known as the Internet 132. If HQ switch 126 is in the HQ position, a TCP connection, in the preferred embodiment, is established, and handset 12 generates a confirmatory signal to the user. The signal is assembled, and then sent by TCP 136 over internet 132. When HQ switch 126 returns to its normal position, the HQ mode terminates and TCP 136 breaks the TCP connection. In this system, there is no distinction between voice and data transmissions. It should be appreciated that any reliable transmission protocol, TCP or otherwise, may be used.

On the receiving end, the signal, is sent to a TCP 138 decoder or a UDP decoder 140. Each packet contains a tag identifying the packet as requiring routing to the TCP decoder or routing to the UDP decoder. Alternately, the packets may be directed to both the TCP and UDP decoder, and the 'wrong' decoder simply will ignore the packet. If the signal is appropriate for the TCP, i.e., contains HQ data, the signal and its data are stored in a queue 142. A receive HQ switch 144 will be set to be in contact with queue 142, or in contact with UDP 140. Queue 142 passes the HQ data to RTP 146 only after all HQ data is received and the TCP connection is broken. The signal reaches RTP 146, is sent to voice decoder 148, and becomes an output 150, either in the form of data instructions or voice. The UDP is less reliable than the TCP, however, it has less delay time than a TCP transfer, less overhead, and is operable to provide real-time communications.

Although a two embodiments of the invention have been disclosed, it will be appreciated that further variations and modifications may be made thereto without departing from the scope of the invention as defined in the appended claims.

We claim:

1. A speech encoding system for use with a digital cellular communication device, a receiving station, and a telecommunications network, comprising:

a high quality (HQ) generation mechanism in the digital cellular communications device for generating speech command HQ data;

means for determining whether a speech communications packet needs to be treated as a data communications packet;

a speech recognition mechanism, located in the telecommunications network, for receiving instructions by speech command; and a control mechanism for responding to said speech command and controlling a controlled entity.

2. The system of claim 1 wherein said means for determining is a push-to-talk button.

3. The system of claim 1 wherein said means for determining is an intelligent speech response system.

4. The system of claim 1 which further incorporates a non-voice-over-IP protocol including a voice coder for encoding a voice command; a layer-two encoder for encoding the signal in a link access protocol; and a first media access controller for controlling transmission of the packetized voice command from the communications device; and wherein the receiving station includes a second media access controller, a layer-two decoder, a speech decoder for decoding the packetized speech; and a transducer for providing an output to said controlled entity.

5. The system of claim 1 which includes a voice-over-IP protocol including a voice coder for encoding a voice-generated signal, a transmission protocol encoder for encoding the signal in a transmission protocol; and wherein the receiving station includes a transmission protocol decoder for decoding the packets and providing an output for controlling said controlled entity.

6. The system of claim 1 wherein said HQ generation mechanism includes a notification mechanism to send a starting indicator and an ending indicator to notify a user when the communications device begins and ends, respectively, HQ data acquisition.

7. The system of claim 6 wherein said notification mechanism includes a time for determining a length of time required to transmit the HQ data and for triggering said notification mechanism to send said ending indicator.

8. A method for encoding a voice command generated on a digital cellular communication device and transmitted over a wireless communication network to a receiving station for controlling a controllable entity, comprising:

recognizing a voice command;

determining whether the voice command needs to be treated as a data communications packet;

encoding the voice command;

connecting the voice command to a voice recognition mechanism; and controlling a controlled entity with the voice command.

9. The method of claim 8 wherein said determining includes activating a push-to-talk button.

10. The method of claim 8 wherein said determining includes transmitting the voice command to an IVR system.

11. The method of claim 8 which includes sending a starting indicator to notify a user that the communications device is in a HQ data acquisition mode.

12. The method of claim 8 which includes sending an ending indicator to notify a user that the communications device is no longer in a HQ data acquisition mode.

13. The method of claim 12 which includes timing data communications packets and triggering the ending indicator.

14. The method of claim 8 which includes incorporating a non-speech-over-IP protocol including encoding a speech command; encoding the packetized data with a layer-two encoder; and decoding the layer-two encoded data in the receiving station for providing an output to the controlled entity.

15. The method of claim 8 which includes incorporating a voice-over-IP protocol including encoding a voice-generated signal with a transmission protocol encoder; transmitting the signal over a communications system using transmission protocol; and decoding the voice generated signal with a transmission protocol decoder for providing an output for controlling the controlled entity.

* * * * *